US009409656B2

(12) United States Patent
Ohtomo et al.

(10) Patent No.: US 9,409,656 B2
(45) Date of Patent: Aug. 9, 2016

(54) AERIAL PHOTOGRAPHING SYSTEM

(71) Applicant: Kabushiki Kaisha TOPCON, Itabashi-ku, Tokyo-to (JP)

(72) Inventors: Fumio Ohtomo, Asaka (JP); Hitoshi Otani, Tokyo-to (JP); Kazuki Osaragi, Tokyo-to (JP); Tetsuji Anai, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 166 days.

(21) Appl. No.: 14/188,846

(22) Filed: Feb. 25, 2014

(65) Prior Publication Data

US 2014/0240498 A1      Aug. 28, 2014

(30) Foreign Application Priority Data

Feb. 28, 2013 (JP) .................................. 2013-038901

(51) Int. Cl.
*H04N 7/18* (2006.01)
*B64D 47/08* (2006.01)
*G01C 11/02* (2006.01)
*G01C 15/00* (2006.01)

(52) U.S. Cl.
CPC ................ *B64D 47/08* (2013.01); *G01C 11/02* (2013.01); *G01C 15/00* (2013.01); *H04N 7/185* (2013.01)

(58) Field of Classification Search
None
See application file for complete search history.

(56) References Cited

U.S. PATENT DOCUMENTS 6,369,755 B1    4/2002    Nichols et al.
6,732,051 B1    5/2004    Kirk et al.
7,071,970 B2*   7/2006    Benton ................... G01C 21/20
                                                        348/207.99
7,804,996 B2    9/2010    Ohtomo et al.
7,982,665 B2    7/2011    Kumagai et al.
8,265,817 B2    9/2012    Tener et al.
8,736,819 B2    5/2014    Nagai
9,073,637 B2    7/2015    Ohtomo et al.
9,201,422 B2   12/2015    Ohtomo et al.
2002/0185618 A1 12/2002   Ohishi et al.
2004/0246461 A1 12/2004   Ohtomo et al.
2005/0286760 A1 12/2005   Ohtomo et al.
2006/0271263 A1 11/2006   Self et al.
2007/0265728 A1 11/2007   Marsh et al.
2008/0075325 A1  3/2008   Otani et al.
2010/0033371 A1  2/2010   Kumagai et al.

(Continued)

FOREIGN PATENT DOCUMENTS

CA      2832956 A1   10/2012
EP      0051913 A1    5/1982

(Continued)

OTHER PUBLICATIONS

European communication mailed Feb. 6, 2015 in co-pending European patent application No. 14171346.1.

(Continued)

*Primary Examiner* — Heather Jones
(74) *Attorney, Agent, or Firm* — Nields, Lemack & Frame, LLC

(57) ABSTRACT

An aerial photographing system, comprising a flying vehicle being remotely controlled, a camera (7, 8) tiltably supported in any direction via a gimbal (25), a retro-reflector (9) tilting integrally with the camera, being set in a known relation with the camera and used as an object to be measured, and a total station (3) for tracking the retro-reflector and for measuring position of the retro-reflector.

6 Claims, 6 Drawing Sheets

(56) References Cited

U.S. PATENT DOCUMENTS

| | | |
|---|---|---|
| 2012/0114229 A1 | 5/2012 | Zhou |
| 2012/0190386 A1 | 7/2012 | Anderson |
| 2012/0320195 A1 | 12/2012 | Tener et al. |
| 2012/0320203 A1 | 12/2012 | Liu |
| 2013/0176570 A1* | 7/2013 | Beck .................... G01N 21/314 356/433 |
| 2014/0210663 A1 | 7/2014 | Metzler |
| 2014/0371952 A1 | 12/2014 | Ohtomo et al. |
| 2015/0116693 A1 | 4/2015 | Ohtomo et al. |
| 2015/0220085 A1 | 8/2015 | Ohtomo et al. |
| 2015/0232181 A1* | 8/2015 | Oakley ................. B64C 39/024 701/2 |
| 2016/0049081 A1 | 2/2016 | Ohtomo et al. |

FOREIGN PATENT DOCUMENTS

| | | |
|---|---|---|
| EP | 2064521 A1 | 6/2009 |
| EP | 2511781 A1 | 10/2012 |
| JP | 5-118850 A | 5/1993 |
| JP | 8-285588 A | 11/1996 |
| JP | 2002-6424 A | 1/2002 |
| JP | 2006-10376 A | 1/2006 |
| JP | 2008-76303 A | 4/2008 |
| JP | 2008-76405 A | 4/2008 |
| JP | 2010-038822 A | 2/2010 |
| WO | 2008/030330 A1 | 3/2008 |
| WO | 2008/067349 A2 | 6/2008 |
| WO | 2008/124713 A2 | 10/2008 |
| WO | 2012/049438 A1 | 4/2012 |

OTHER PUBLICATIONS

IEEE, Proceedings of SICE Annual Conference 2010, Aug. 18-21, 2010, "Control System Design for Visual Based Indoor Inspection Helicopter", pp. 811-816, Higuchi, et al.

Notice of Allowance mailed Mar. 2, 2015 in co-pending U.S. Appl. No. 14/297,869.

European communication dated Mar. 26, 2015 in co-pending European patent application No. 14189220.8.

European communication dated Apr. 1, 2015 in co-pending European patent application No. 15151179.7.

* cited by examiner

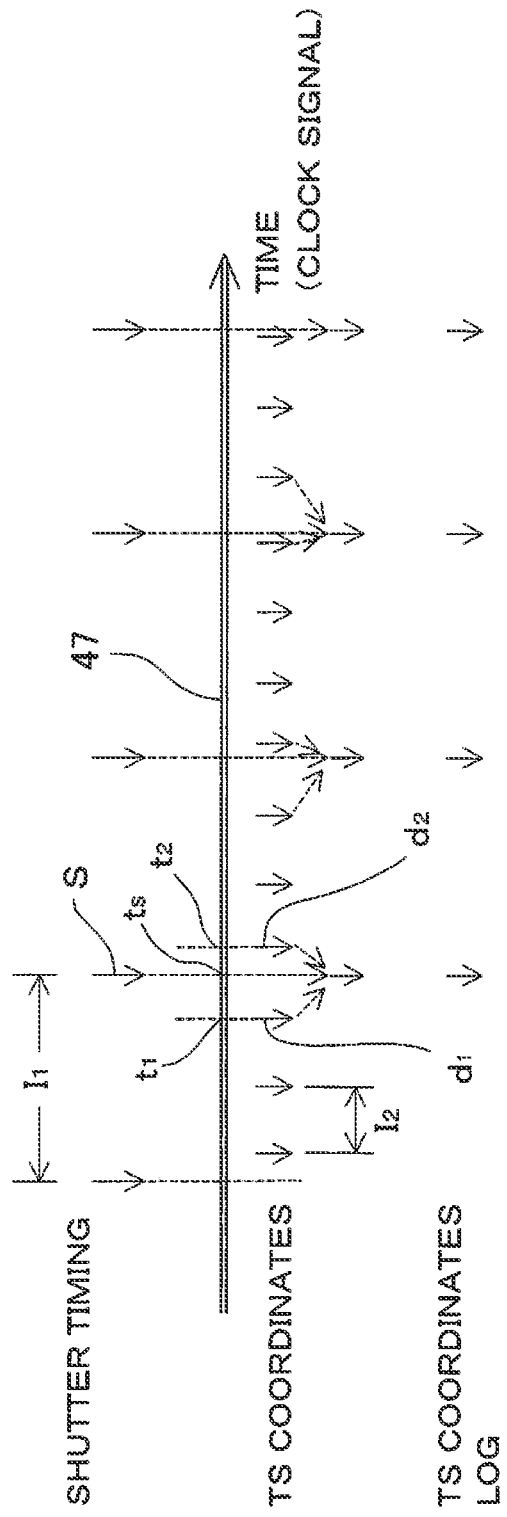

AERIAL PHOTOGRAPHING SYSTEM

BACKGROUND OF THE INVENTION

The present invention relates to an aerial photographing system with a camera for photogrammetry installed on a small type flying vehicle.

In recent years, with the progress of UAV (Unmanned Air Vehicle), photogrammetry using UAV has been developed by installing a camera for photogrammetry on UAV.

Normally, a UAV makes flight by tilting its vehicle body in forwarding direction, while the tilting of the vehicle body of the UAV is very likely to be influenced by its speed of propulsion and by wind, and a stability of the tilting is low. On the other hand, in aerial photogrammetry, it is necessary to photograph the images in vertical and downward direction with high precision, and the stability is required on the tilting of the camera.

Further, in aerial photogrammetry, it is necessary to have ground coordinates of the photographing point in order to perform ground orientation (absolute orientation) of an aerial photograph as taken. Conventionally, as a method of obtaining the ground coordinates of the UAV, a GPS device is installed on the UAV and the ground coordinates of the UAV are obtained by the GPS device.

However, since the GPS device obtains the ground coordinates by using radio waves from artificial satellite, ground coordinates of the UAV cannot be obtained by the GPS device in places where radio waves cannot be received, such as in a tunnel or urban areas and the like bristling with skyscrapers.

SUMMARY OF THE INVENTION

It is an object of the present invention to provide an aerial photographing system, by which an image in vertical and downward direction can be acquired in stable manner regardless of how the posture of the small type flying vehicle changes.

To attain the above object, the aerial photographing system according to the present invention comprises a flying vehicle being remotely controlled, a camera tiltably supported in any direction via a gimbal, a retro-reflector tilting integrally with the camera, being set in a known relation with the camera and used as an object to be measured, and a total station for tracking the retro-reflector and for measuring position of the retro-reflector.

Further, in the aerial photographing system according to the present invention, the camera is mounted on a gimbal via a supporting member, and the camera is set up so that an optical axis is directed in vertical direction, and is installed on least one of the upper end or the lower end of the supporting member.

Further, in the aerial photographing system according to the present invention, there is provided a ground base station having an arithmetic device, a storage unit, and a base communication unit, measurement results are transmitted to the ground base station from the total station, wherein the flying vehicle has a flying vehicle communication unit, wireless communication is possible between the flying vehicle communication unit and the ground base communication unit, wherein the flying vehicle communication unit transmits image data photographed by the camera and shutter timing information to acquire the image data to the base communication unit, and wherein the arithmetic unit acquires the measurement results of the time, being coincident with the shutter timing information received, and identifies the photographing position based on the measurement results.

Further, in the aerial photographing system according to the present invention, the retro-reflector is disposed to face toward the downward direction, and has optical characteristics to retro-reflect light components entering from all ranges below the retro-reflector.

Further, in the aerial photographing system according to the present invention, the flying vehicle has a magnetic compass, wherein the measurement results are corrected to the position of the camera based on a known relation between the retro-reflector and the camera and on the direction of the flying vehicle detected by the magnetic compass.

According to the present invention, the aerial photographing system comprises a flying vehicle being remotely controlled, a camera tiltably supported in any direction via a gimbal, a retro-reflector tilting integrally with the camera, being set in a known relation with the camera and used as an object to be measured, and a total station for tracking the retro-reflector and for measuring position of the retro-reflector. As a result, images can be taken in stable manner regardless of how the posture of the small type flying vehicle is changed, and even under a circumstance where radio waves from artificial satellite cannot be received, ground coordinates of the small type flying vehicle can be measured, and aerial photogrammetry can be performed.

Further, according to the present invention, in the aerial photographing system, the camera is mounted on a gimbal via a supporting member, and the camera is set up so that an optical axis is directed in vertical direction, and is installed on at least one of the upper end or the lower end of the supporting member. As a result, at least one of the images in vertical and downward direction or in vertical and upward direction is easily acquired.

Further, according to the present invention, in the aerial photographing system, there is provided a ground base station having an arithmetic device, a storage unit, and a base communication unit, measurement results are transmitted to the ground base station from the total station, wherein the flying vehicle has a flying vehicle communication unit, wireless communication is possible between the flying vehicle communication unit and the ground base communication unit, wherein the flying vehicle communication unit transmits image data photographed by the camera and shutter timing information to acquire the image data to the base communication unit, and wherein the arithmetic unit acquires the measurement results of the time, being coincident with the shutter timing information received, and identifies the photographing position based on the measurement results. As a result, it is possible to specify the position of the photographing point reliably, and because it is a position measurement by a total station, photographing position can be specified with high accuracy, and a highly accurate photogrammetry becomes possible.

Further, according to the present invention, in the aerial photographing system, the retro-reflector is disposed to face toward the downward direction, and has optical characteristics to retro-reflect light components entering from all ranges below the retro-reflector. As a result, tracking in all directions by the total station is possible, and photogrammetry can be performed by the flying vehicle without any restrictions in a wide range.

Furthermore, according to the present invention, in the aerial photographing system, the flying vehicle has a magnetic compass, wherein the measurement results are corrected to the position of the camera based on a known relation between the retro-reflector and the camera and on the direction of the flying vehicle detected by the magnetic compass. As a result, even in case of measurement of high accuracy where deviation between the prism and the camera occur as a measurement error, it is possible to cope with the problems without decreasing the accuracy.

BRIEF DESCRIPTION OF THE DRAWINGS

FIG. 7 is a timing chart to obtain a photographing position at a photographing time.

DETAILED DESCRIPTION OF THE PREFERRED EMBODIMENT

Description will be given below on an embodiment of the present invention by referring to the attached drawings.

Figure 1:
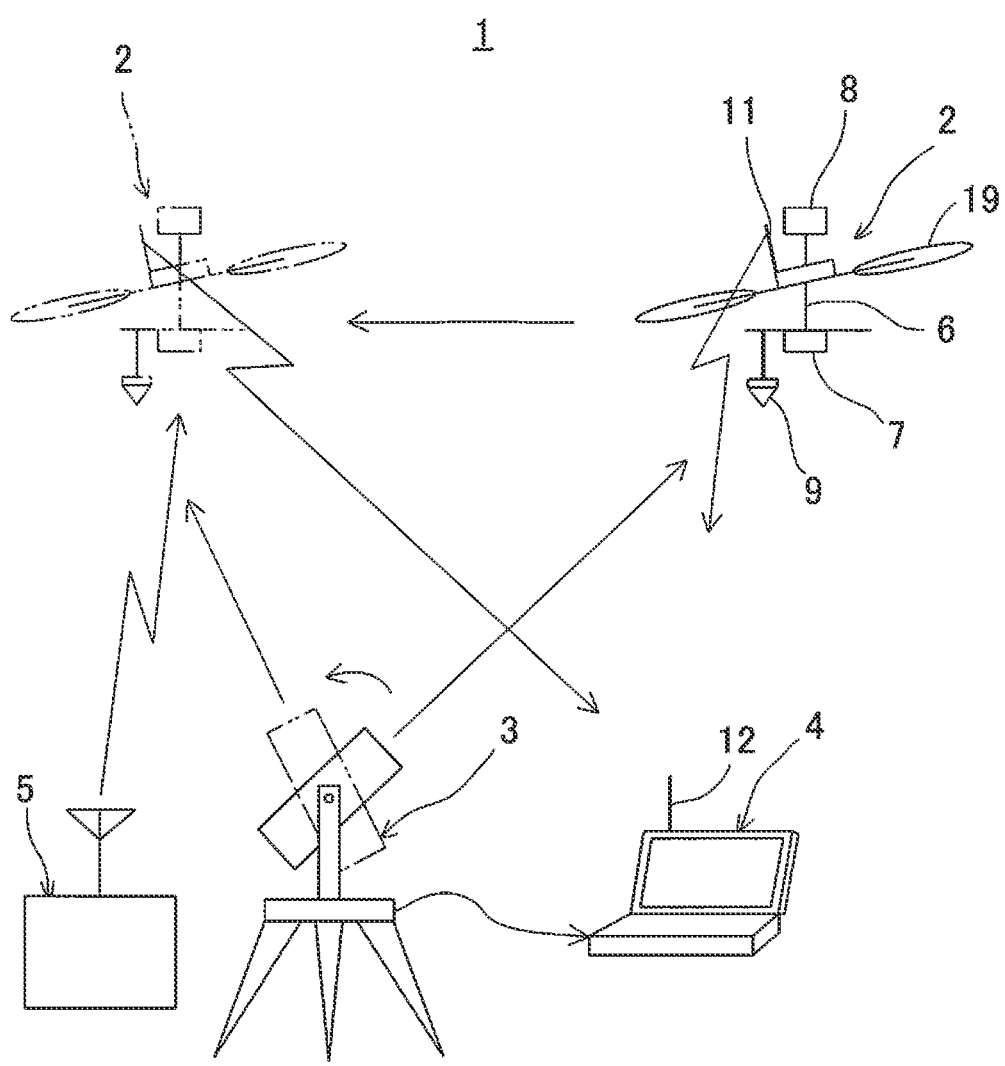
FIG. 1 is a block diagram to show an aerial photographing system according to the present embodiment.

First, by referring to FIG. 1, description will be given on an aerial photographing system 1 according to the present embodiment.

The aerial photographing system 1 primarily comprises an aerial photographing device 2, a total station (TS) 3, a ground base station 4, and a remotely controlling device 5.

The aerial photographing device 2 primarily comprises a shaft 6 used as a supporting member supported in vertical direction on a flying vehicle (to be described later) via a gimbal mechanism, a lower camera 7 and an upper camera 8 installed on a lower end and on an upper end of the shaft 6 respectively, a prism 9 installed on lower end of the shaft 6 and used as a retro-reflector integrated with the lower camera 7, and a flying vehicle communication unit 11 to perform communication to and from the ground base station 4. Optical axis of each of the lower camera 7 and the upper camera 8 coincides with the center line of the shaft 6 so as to be maintained in vertical direction at all times. Also, the optical axis of the prism 9 is set so as to be in vertical direction, and the positional relation of the prism 9, the lower camera 7, and the upper camera 8 is also already known. It will suffice if the optical axis of each of the lower camera 7, the upper camera 8, and the prism 9 are supported in vertical direction, and the optical axis of each of the lower camera 7 and the upper camera 8 and the center line of the shaft 6 may not coincide with each other, or the center line of the shaft 6 may not necessarily be set in vertical direction.

The prism 9 is set in downward direction, and the prism 9 has an optical characteristic such that the light entering from the whole range below the prism 9 are retro-reflected. Further, instead of the prism 9, a reflection seal may be provided at a predetermined position of the shaft 6.

The total station 3 is installed at a known point and while tracking the prism 9, the total station 3 measures three-dimensional coordinates of the prism 9. The total station 3 is electrically connected with the ground base station 4 by wired or wireless means, and the three-dimensional coordinates thus measured are inputted to the ground base station 4 as coordinates data.

The ground base station 4 is a personal computer (PC), for instance, and has an arithmetic unit having an arithmetic function, a storage unit where data and programs are stored, and further, has a base communication unit 12 so that a wireless communication can be performed between the base communication unit 12 and the flying vehicle communication unit 11.

The remotely controlling device 5 remotely controls the flight of the aerial photographing device 2 and can remotely control the shutters of the lower camera 7 and the upper camera 8.

Description will be given on general features of an operation of the aerial photographing system 1.

By the remotely controlling device 5, the aerial photographing device 2 is operated to fly along a scheduled flight course by remote-controlling. During the flight of the aerial photographing device 2, the total station 3 tracks the prism 9, and three-dimensional coordinates of the prism 9 are measured in real time.

The lower camera 7 and the upper camera 8 of the aerial photographing device 2 are set so that still images for photogrammetry are taken at a predetermined time interval. The still images are transmitted to the ground base station 4 as still image data, and timings of taking the still images (photographing time) are transmitted to the ground base station 4.

The ground base station 4 receives the still image data and the photographing time when the still image data is acquired, via the base communication unit 12. Still image data and the photographing time are stored in the storage unit. Further, the ground base station 4 receives the measurement results from the total station 3, acquires three-dimensional coordinates of the photographing time, and associates the three-dimensional coordinates with the still images. It is to be noted that the still images may be stored in the aerial photographing device 2. In this case, the still images are associated with the photographing time. The still images may be associated with the three-dimensional coordinates based on the photographing time at the ground base station 4 after the flight.

The photographing of the still images by the lower camera 7 and the upper camera 8 may be carried out manually by the remotely controlling device 5. In this case also, the photographing time is transmitted to the ground base station 4 from the aerial photographing device 2.

Which of the lower camera 7 or the upper camera 8 is to be used to carry out the photographing should be adequately selected, according to the object to be measured. For instance, in a case where agricultural product or architectural structure and the like on a ground surface is the object to be measured, the photographing is performed in vertically downward direction by using the lower camera 7, and in a case where a bridge girder or a ceiling of a tunnel is the object to be measured, photographing is performed in vertically upward direction by using the upper camera 8. Further, in the measurement of a bridge girder or a ceiling of a tunnel, etc., photographing may be performed in vertically downward direction and in vertically upward direction at the same time by the lower camera 7 and the upper camera 8.

Still images are acquired by the lower camera 7 and the upper camera 8, and three-dimensional coordinates (ground coordinates) of the prism 9 at the moment when still images are photographed are measured by the total station 3. The three-dimensional coordinates thus measured are transmitted to the ground base station 4 as coordinates data.

The lower camera 7 and the upper camera 8 are separated from the prism 9 at a distance already known, but in a case where the measurement accuracy is not required, the position of the prism 9 is regarded as the positions of the lower camera 7 and the upper camera 8. Further, in a case where accuracy is required, in the ground base station 4, positions of the lower camera 7 and the upper camera 8 are determined based on the position of the prism 9 from the relation already known between the lower camera 7, the upper camera 8 and the prism 9 and based on the direction of the flying vehicle 15 (to be described later) as detected by a magnetic compass 29 (to be described later) and on the position of the prism 9.

When still images are photographed at two geographical points and coordinates of the two photographing points are measured, a distance (base line length) between the two geographical points is determined. Then, the coordinates of the photographing points of two still images and the base line length necessary for photogrammetry are obtained. Further, coordinates of the photographing point of the still image is obtained with high accuracy because the coordinates are measured by the total station 3, and photogrammetry with high accuracy becomes possible.

Figure 2:
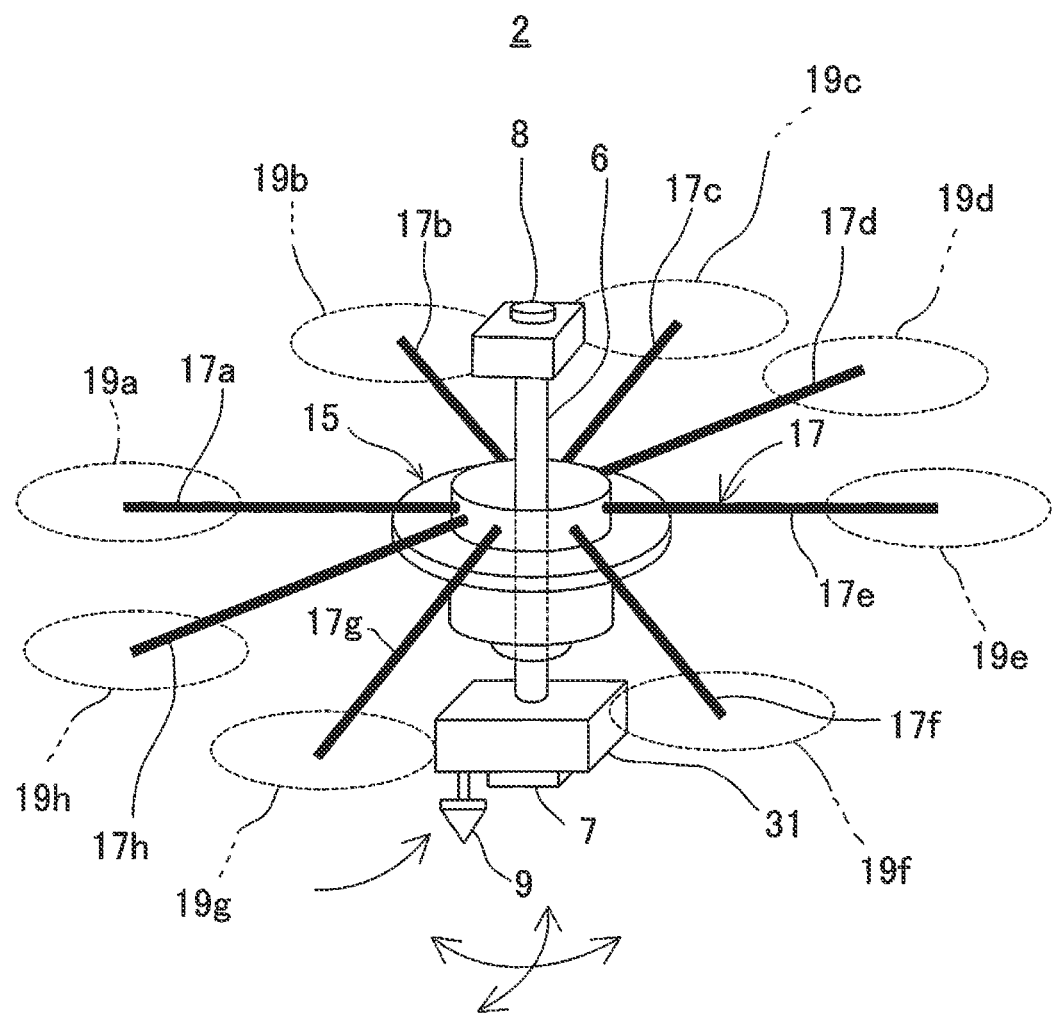
FIG. 2 is a perspective view of an aerial photographing device according to the present embodiment.
Figure 3:
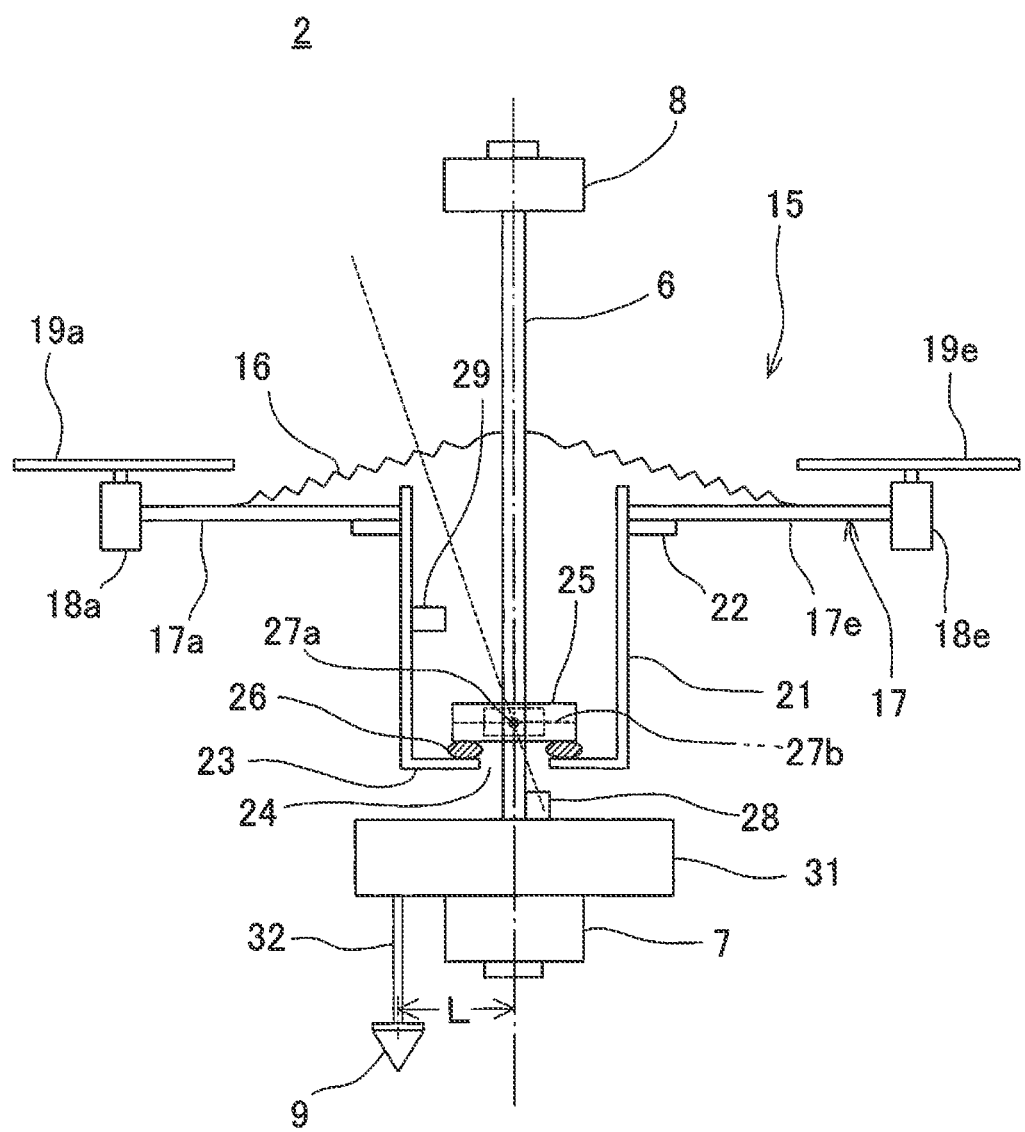
FIG. 3 is a cross-sectional view of the aerial photographing device.

Next, referring to FIG. 2 and FIG. 3, description will be given on the aerial photographing device 2.

The flying vehicle 15 has a plurality of and an even number of propeller frames 17 extending in radial direction, and a propeller unit is provided at a forward end of each of the propeller frames 17. The propeller units are made up of a propeller motor 18 mounted at a forward end of the propeller frame 17, and a propeller 19 mounted on the output shaft of the propeller motor 18. The propeller 19 is rotated by the propeller motor 18, and arranged so that the flying vehicle 15 flies.

The flying vehicle 15 has a main frame 21 designed in hollow cylindrical shape in the center of the flying vehicle 15. An outer flange 22 extending in outer direction is provided at an upper end of the main frame 21 and an inner flange 23 extending toward the center is provided at a lower end. At the center of the inner flange 23, a circular hole 24 is formed.

The propeller frame 17 is designed in form of a rod and is installed within a plane which perpendicularly crosses a center line of the main frame 21, and a predetermined number (at least four pieces, more preferably eight pieces; in the FIG. 8, propeller frames (17a to 17h) are shown) of the propeller frames 17 are arranged at equal angular interval in a horizontal direction. An inner end of the propeller frame 17 penetrate the main frame 21 and is fixed on the outer flange 22.

The shaft 6 is provided so as to penetrate the main frame 21 in up-to-down direction, the shaft 6 is supported by a gimbal 25 so as to be in vertical direction, and the gimbal 25 is mounted on the inner flange 23 via a vibration-proof member 26.

The gimbal 25 has rocking shafts 27a and 27b, which are running in two directions are crossing perpendicularly to each other, and supports the shaft 6 as freely movable in two directions crossing perpendicularly to each other. The vibration-proof member 26 absorbs vibrations caused by the rotation of the propeller motor 18 and the propeller 19 so that the vibration may not be transmitted to the shaft 6.

A tilt sensor 28 is provided on a lower end of the shaft 6 and detects abrupt tilting of the gimbal 25, which is caused by the change in acceleration of the flying vehicle 15. Further, the tilt sensor 28 detects an angle between the vertical line and the center line of the shaft 6 when the shaft 6 is tilted with respect to the vertical line, and detection results of the tilt sensor 28 are transmitted to a control device 35 (see FIG. 4) which will be described later.

A magnetic compass 29 is disposed at a position as required on the main frame 21, and the magnetic compass 29 detects the direction of the flying vehicle 15. Regarding the direction of the flying vehicle 15, a direction running perpendicularly with respect to the plane including the center line of the shaft 6 and the optical axis of the prism 9 is regarded as the front-to-back direction, for instance.

On the lower end of the shaft 6, a control box 31 is provided. Inside the control box 31, the control device 35 (see FIG. 4) is accommodated. The lower camera 7 is disposed on the lower surface of the control box 31, a prism pillar 32 is vertically arranged at a position separated at a known distance L with respect to the lower camera 7, and the prism 9 is disposed on the lower end of the prism pillar 32.

At the upper end of the shaft 6, the upper camera 8 is disposed. The optical axis of the upper camera 8 and the optical axis of the lower camera 7 coincide with the center line of the shaft 6, and the optical axis of the prism 9 is running in parallel to the center line of the shaft 6. The lower camera 7 photographs in vertically downward direction, and the upper camera 8 photographs in vertically upward direction.

The control box 31, the lower camera 7, the prism 9, etc. fulfill functions as balance weight, and under the condition where no external force is applied on the shaft 6, i.e. under a free condition, weight balance is maintained on the control box 31, the lower camera 7, and the prism 9 so that the shaft 6 is kept in a vertical condition.

A balance supporting member may not particularly have to be provided when the shaft 6 can be sufficiently maintained in stable manner in vertical position by the balance weight functions of the control box 31, the lower camera 7, the prism 9, etc., but the balance supporting member may be provided in order to maintain the shaft 6 in vertical position, and so that the shaft 6 can be promptly restored to a vertical condition in a case where the shaft 6 tilts rapidly (in a case where the posture of the flying vehicle 15 rapidly changes).

In the example as given below, description will be given on a case where a damper spring 16 is provided as a balance supporting member.

A damper spring 16 is stretched over between the propeller frame 17 and the shaft 6. At least three pieces, or more preferably, four pieces of damper springs 16 are provided. It is preferable that the damper spring 16 is mounted between each of the propeller frames 17 extended parallel to the rocking shafts 27a and 27b and the shaft 6 respectively.

Also, each of the four damper springs 16 applies tensile force between the shaft 6 and the propeller frame 17 respectively so that the shaft 6 can maintain the vertical condition by the balancing of the tensile forces when the flying vehicle 15 takes horizontal posture (i.e. a condition where the propeller frames 17 are in horizontal condition). Further, the tensile force and spring constant of the damper spring 16 are set to smaller values so that the shaft 6 is directed in vertical direction due to the gravitational force when the flying vehicle 15 is tilted.

The damper spring 16 is a biasing means to apply biasing force on the shaft 6 to set the shaft 6 in vertical condition. When the shaft 6 is moved, or vibrated, the damper spring 16 promptly restores the shaft 6 to a vertical condition and makes vibration attenuated. Further, as the biasing means, a torsion coil spring may be used to rotate in a returning direction as a substitute for the damper spring 16 in a case where the rocking shafts 27a and 27b of the gimbal 25 are rotated.

Figure 4:
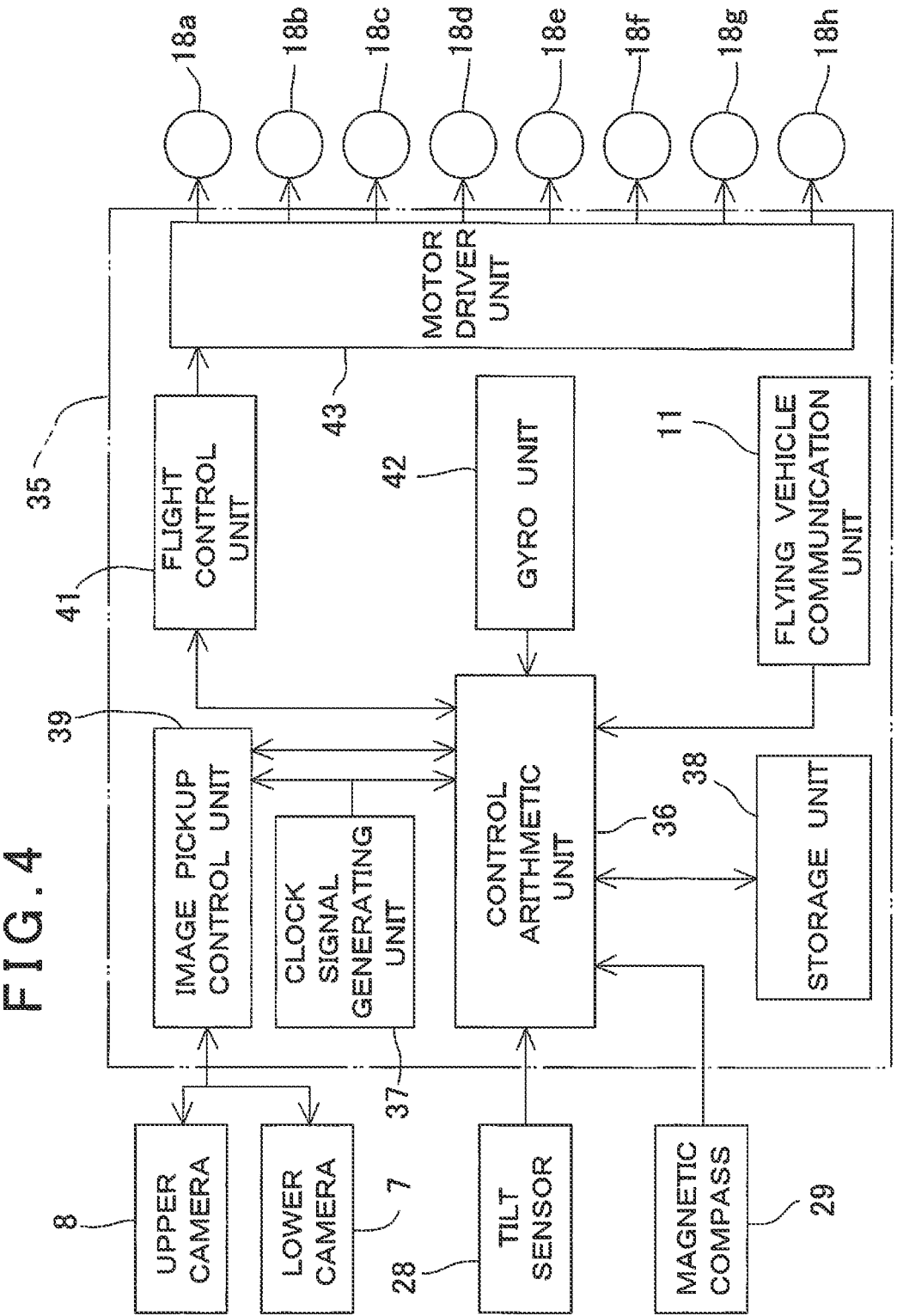
FIG. 4 is a block diagram of a control system of the aerial photographing device.

By referring to FIG. 4, description will be given on a control system of the aerial photographing device 2.

Inside the control box 31, the control device 35 is accommodated.

The control device 35 primarily comprises a control arithmetic unit 36, a clock signal generating unit 37, a storage unit 38, an image pickup control unit 39, a flight control unit 41, a gyro unit 42, a motor driver unit 43, and a flying vehicle communication unit 11.

The photographings of the lower camera 7 and the upper camera 8 are controlled by the image pickup control unit 39, and the images taken by the lower camera 7 and the upper camera 8 are inputted to the image pickup control unit 39 as image data.

As the lower camera 7 and the upper camera 8, digital cameras are used so that still image can be photographed, and video images can also be taken. Further, as an image pickup element, a CCD or CMOS sensor, etc., each being an assembly of pixels, is used, and a position of each pixel in the image pickup element can be identified. As described above, the optical axis of each of the lower camera 7 and the upper camera 8 coincides with the center line of the shaft 6, and the optical axis of the prism 9 runs in parallel to the center line of the shaft 6. Further, the optical axis of the prism 9 and optical axis of the lower camera 7 are in a positional relation already known to each other.

A program storage unit and a data storage unit are formed in the storage unit 38. In the program storage unit, the following programs are stored: a photographing program in order to control the photographing of the lower camera 7 and the upper camera 8, a flight control program for driving and controlling the propeller motor 18, a communication program for transmitting the data acquired to the ground base station 4 and for receiving a flight command and the like from the remotely controlling device 5, a data processing program for processing the data obtained by the lower camera 7 and the upper camera 8 and for storing the data, an image tracking program for performing tracking by using video images, and other programs.

In the data storage unit, still image data and video image data, etc. as acquired by the lower camera 7 and the upper camera 8 are stored.

The image pickup control unit 39 carries out control concerning image pickup operation of the lower camera 7 and the upper camera 8 based on control signals issued from the control arithmetic unit 36. The modes of control operation include: selecting of the camera to be used depending on the object to be measured, synchronous controlling of the lower camera 7 and the upper camera 8, and controlling to acquire still images at a predetermined time interval while acquiring video images, and the like. For the lower camera 7 and the upper camera 8, photographing time is controlled or synchronously controlled according to clock signals issued from the clock signal generating unit 37.

The magnetic compass 29 detects the direction of the flying vehicle 15 and inputs a detection result to the control arithmetic unit 36. The gyro unit 42 detects a posture of the flying vehicle 15 under flying condition and inputs a detection result to the control arithmetic unit 36.

The flying vehicle communication unit 11 receives control signal from the remotely controlling device 5 in a case where the flight of the flying vehicle 15 is remotely controlled by the remotely controlling device 5 and inputs the control signal to the control arithmetic unit 36. Or the flying vehicle communication unit 11 has a function such as transmitting the image data photographed by the lower camera 7 and the upper camera 8 to the ground base station 4 on the ground side.

The control arithmetic unit 36 executes the control necessary for acquiring images based on the required program stored in the storage unit 38. Further, the control arithmetic unit 36 calculates a control signal relating to the flight based on the control signal and on the detection result of the gyro unit 42, and outputs the control signals to the flight control unit 41.

When the control signal relating to the flight is inputted from the control arithmetic unit 36, the flight control unit 41 drives the propeller motor 18 to a condition as required via the motor driver unit 43 according to the control signal.

Figure 5:
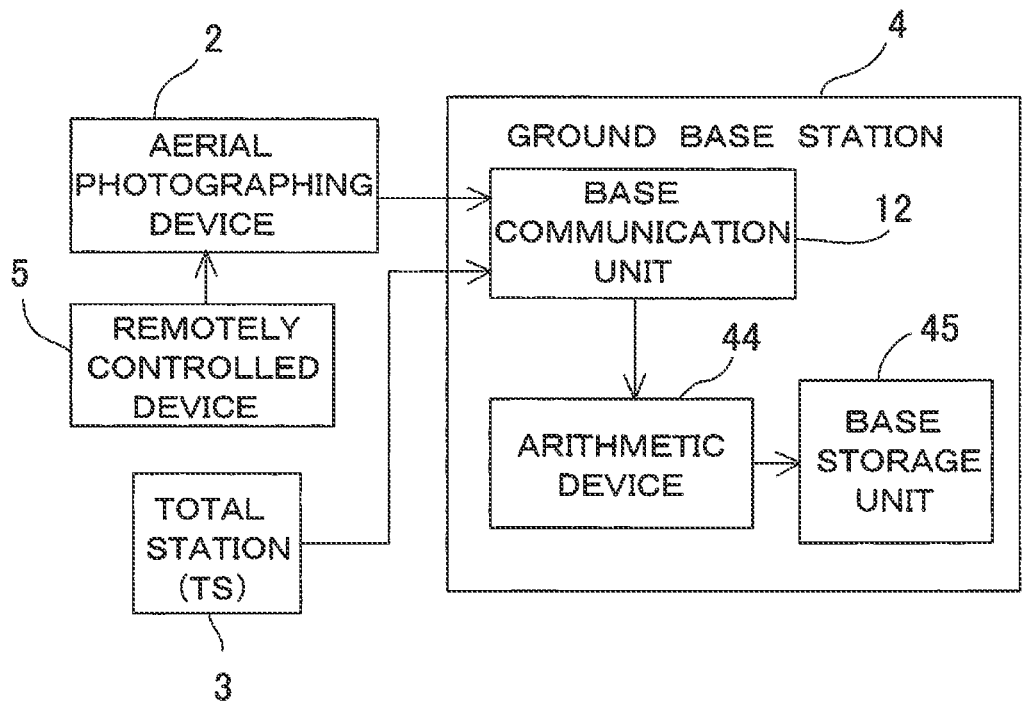
FIG. 5 is a diagram to show the relation of the aerial photographing device, a ground base station, and a remotely controlling device.

FIG. 5 is a block diagram to show the relation of the aerial photographing device 2, the total station 3, the ground base station 4, and the remotely controlling device 5.

The ground base station 4 has the base communication unit 12, an arithmetic unit 44, and a base storage unit 45.

The base communication unit 12 carries out communication between the aerial photographing device and the total station 3. The base communication unit 12 receives image data and shutter timing information of time moment when the image data have been picked up from the aerial photographing device 2, and receives coordinates data from the total station 3. The arithmetic unit 44 has a clock signal generating unit, associates the image data, the shutter timing information and the coordinates data, as received, with clock signals, processes the image data, the shutter timing information and the coordinates data as time series data based on the clock signals, and stores the image data, the shutter timing information and the coordinates data in the base storage unit 45.

The base storage unit 45 has a data storage region and a program storage region. Data such as image data and coordinate data are stored in the data storage region. In the program storage region, various types of programs are stored: including a calculation program required for photogrammetry, a communication program for performing communication between the base communication unit 12 and the flying vehicle communication unit 11, a program for calculating photographing positions where still images are acquired based on shutter timing and surveying data, and other programs.

Description will be given below on the operation of the aerial photographing device 2 according to the present embodiment.

In a case where the flight of the flying vehicle 15 is to be controlled, the driving of propellers is controlled by setting two propeller motors 18 as one set. For instance, propeller motors 18a and 18b, propeller motors 18c and 18d, propeller motors 18e and 18f, and propeller motors 18g and 18h are regarded as one set respectively, and rotating and driving of each of propellers 19a and 19b, propellers 19c and 19d, propellers 19e and 19f, and propellers 19g and 19h is individually controlled.

For instance, if the propeller motors 18a to 18h are evenly driven and if thrust force caused by rotation of the propellers 19a to 19h are controlled in the same manner, the flying vehicle 15 flies upward in vertical direction.

Figure 6:
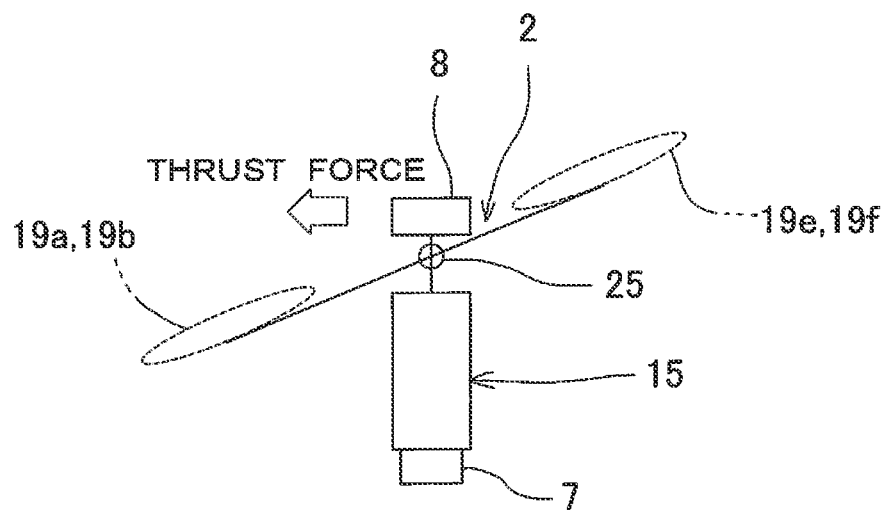
FIG. 6 is an explanatory drawing to show the flying condition of a flying vehicle.

Also, in a case where the flying vehicle 15 is to make flight (moved) in a horizontal direction, for instance, die flying vehicle 15 is moved in a leftward direction in the figure as shown in FIG. 6, if the propeller motors 18e and 18f are rotated in increasing speed and the thrust forces of the propellers 19e and 19f are increased than the propellers 19a and 19b, the flying vehicle 15 is tilted, and the thrust force acts in diagonally downward direction. As a result, a horizontal component force is generated, and the flying vehicle 15 is moved in the horizontal direction.

Even in a condition where the flying vehicle 15 is tilted, the shaft 6 is maintained in vertical direction by the action of gravitational force. Therefore, optical axes of the lower camera 7 and the upper camera 8 are maintained in the vertical direction. At the same time, optical axis of the prism 9 is also maintained in the vertical direction. The lower camera 7 acquires images in a vertically downward direction, and the upper camera 8 acquires images in a vertically upward direction. Here, description will be given on a case where the images are acquired by the lower camera 7 in downward direction.

The total station 3 sights the prism 9 and while tracking the prism 9, measures the position (three-dimensional coordinates) of the prism 9 in real time The aerial photographing device 2 is controlled by the remotely controlling device 5, and while the aerial photographing device 2 is flying, video images are taken by the lower camera 7, and still images are acquired at the time interval as required. It is to be noted that, regarding the time interval and a timing of photographing to pick up still images may be programmed in advance, or a photographing point to pick up still images may be selected, and a command for photographing may be issued by the remotely controlling device 5. Description will be given below on a case where still images are picked up at the time interval as programmed in advance.

The control arithmetic unit 36 issues a control command regarding the photographing of the lower camera 7 to the image pickup control unit 39. Based on the control command, the image pickup control unit 39 issues a shutter signal to the lower camera 7. Based on the shutter signal, the lower camera 7 picks up a still image. Further, the shutter signal from the image pickup control unit 39 is transmitted to the ground base station 4 via the flying vehicle communication unit 11 and image pickup time every each of the still images is recorded at the ground base station 4.

Further, the measurement result by the total station 3 with respect to the prism 9 is acquired at the moment when the shutter time is received, and a position (three-dimensional position) where the still image is acquired can be identified.

Also, positional relation between the lower camera 7 and the prism 9 is already known and fixed. Further, since the direction of the flying vehicle 15 is detected by the magnetic compass 29, it is possible to correct the measured value from the positional relationship already known and from the direction of the flying vehicle 15, and by correcting the measured value, it is possible to determine three-dimensional position of the lower camera 7, i.e. the photographing position of the lower camera 7.

Next, in order to execute photogrammetry by the still images taken at two points adjacent to each other, it is necessary to perform relative orientation of the two images at two points, and in order to carry out the relative orientation, it is necessary to determine at least five feature points which are common between the two still images.

In order to set the feature points, feature points are extracted by image processing such as edge processing from the first image, and the feature points common in the next still images are specified by video image tracking.

It is to be noted that, video image tracking is described in the Japan Patent Application Publication JP-A-2006-10376.

After the relative orientation, absolute orientation is performed based on the three-dimensional coordinates of the photographing points, and photogrammetry is carried out based on the images, absolute orientation of which have been performed.

With respect to photogrammetry, photogrammetry may be carried out in real time every time the still image data are transmitted to the ground base station 4, or the still image data and the surveying data up to the completion of the flight may be preserved at the ground base station 4, and photogrammetry may be carried out based on the still image data and the surveying data after the flight.

As described above, the photographing position of the still image is measured with high accuracy because the photographing position is measured by the total station 3, and further, even under the environment where radio waves from the artificial satellite do not reach, photogrammetry can be accomplished by the aerial photographing device 2.

In the explanation as given above, the position of the prism 9 is measured in real time by the total station 3 and the photographing position of the still image is acquired by synchronizing with shutter timing. Description will be given below on a case where data of distance measurement is acquired by the total station 3 at a predetermined time interval.

There are the cases where the photographing timing (shutter timing) by the aerial photographing device 2 is not always consistent with the timing of the acquisition of coordinate data by the total station 3.

FIG. 7 shows a method to acquire three-dimensional coordinates of the photographing position in a case where the photographing timing and the timing to acquire the surveying data are not synchronized.

If it is supposed that the photographing by the lower camera 7 is performed at I1 time intervals and the surveying result by the total station 3 has been carried out at time interval of I2 (I2<I1), there will be almost no case where the measurement result is acquired at the time coincident with the photographing time.

When the shutter timing is received from the aerial photographing device 2, the time of the shutter timing can be identified from a clock signal 47. Further, measurement results are acquired at I2 time intervals, and the time when each of the measurement results has been acquired can be identified from the clock signal 17.

With respect to the shutter timing s (time ts), measurement results d1 and d2 are selected which are positioned before and after in terms of time, and the time (t1, t2) when each of the measurement results d1 and d2 has been measured are specified from the clock signal 47.

By using the relationship between the time ts and the time t1 and t2, a measured value of the shutter timing s can be obtained by interpolation with respect to the measurement results d1 and d2.

And even when the photographing time is not synchronized with the measurement timing, an accurate position measurement can be performed.

It is to be noted that, in the description as given above, the lower camera 7 and the upper camera 8 are provided at a lower end and at an upper end of the shaft 6 respectively, while one of these may be omitted. Further, in case where the lower camera 7 is omitted, the prism 9 may be provided at the lower end of the shaft 6. When the prism 9 is provided at the lower end of the shaft 6, the optical axis of the upper camera 8 is consistent with the optical axis of the prism 9, so there will be no need to correct the measurement results of the total station 3.

Further, the shaft 6 is supported by the gimbal 25 so as to be directed in vertical direction by the action of the gravitational force, while the shaft 6 may be arranged in such a manner that a motor is connected to each of the rocking shafts 27a and 27b (see FIG. 3) and the rocking shafts 27a and 27b are rotated forcibly in the direction reverse to the tilting based on the tilting signal from the tilt sensor 28, so that the vertical condition is maintained.

The invention claimed is:

1. An aerial photographing system, comprising a flying vehicle being remotely controlled, a camera tiltably supported in any direction via a gimbal, a retro-reflector tilting integrally with said camera, being set in a known relation with said camera and used as an object to be measured, and a total station installed at a known point for tracking the retro-reflector and for measuring three-dimensional coordinates of the retro-reflector.

2. An aerial photographing system according to claim 1, wherein said camera is mounted on a gimbal via a supporting member, and said camera is set up so that an optical axis is directed in vertical direction, and is installed on at least one of the upper end or the lower end of said supporting member.

3. An aerial photographing system according to one of claim 2, wherein there is provided a ground base station having an arithmetic device, a storage unit, and a base communication unit, measurement results are transmitted to said ground base station from said total station, wherein said flying vehicle has a flying vehicle communication unit, wireless communication is possible between said flying vehicle communication unit and said base communication unit, wherein said flying vehicle communication unit transmits image data photographed by said camera and shutter timing information to acquire said image data to said base communication unit, and wherein said arithmetic device acquires the measurement results of the time, being coincident with the shutter timing information received, and identifies the photographing position based on the measurement results.

4. An aerial photographing system according to one of claim 1, wherein there is provided a ground base station having an arithmetic device, a storage unit, and a base communication unit, measurement results are transmitted to said ground base station from said total station, wherein said flying vehicle has a flying vehicle communication unit, wireless communication is possible between said flying vehicle communication unit and said base communication unit, wherein said flying vehicle communication unit transmits image data photographed by said camera and shutter timing information to acquire said image data to said base communication unit, and wherein said arithmetic device acquires the measurement results of the time, being coincident with the shutter timing information received, and identifies the photographing position based on the measurement results.

5. An aerial photographing system according to claim 1, wherein said retro-reflector is disposed to face toward the downward direction, and has optical characteristics to retro-reflect light components entering from all ranges below the retro-reflector.

6. An aerial photographing system according to claim 1, wherein said flying vehicle has a magnetic compass, wherein said measurement results are corrected to the position of said camera based on a known relation between said retro-reflector and said camera and on the direction of said flying vehicle detected by said magnetic compass.

* * * * *